March 7, 1933.　　　H. D. CHURCH　　　1,900,484
HEAVY DUTY AUTOMOBILE CONSTRUCTION
Filed April 20, 1929　　2 Sheets-Sheet 1
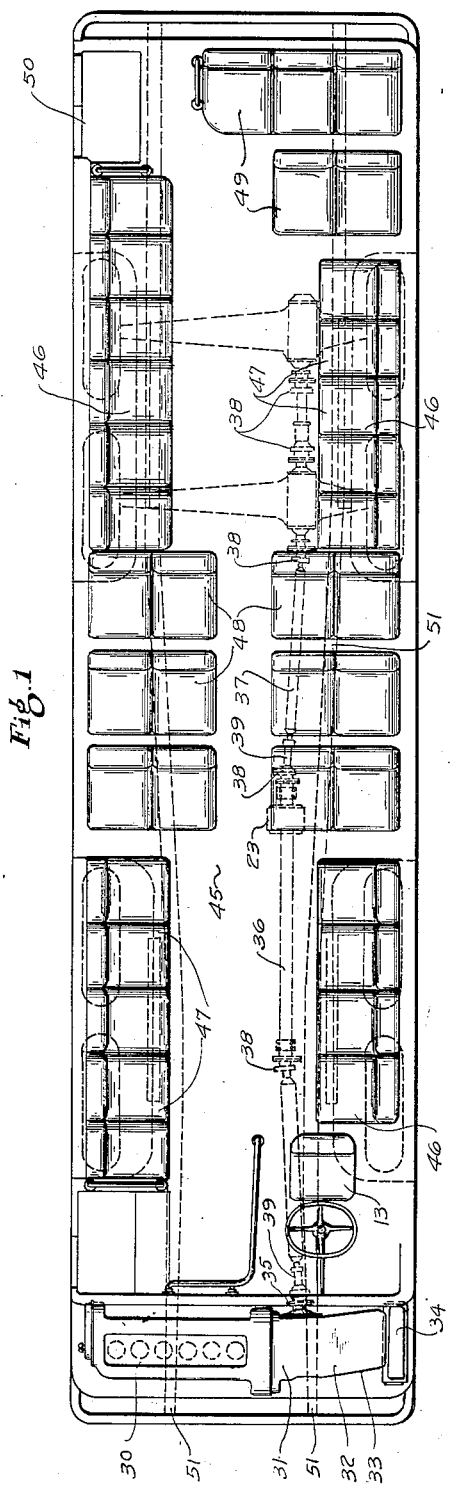
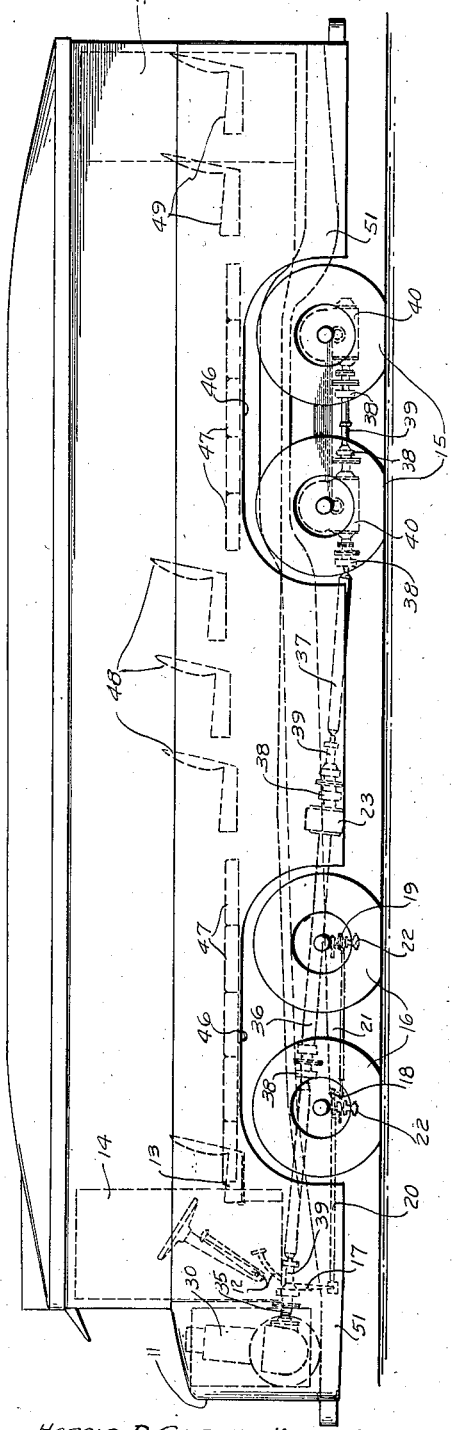
HAROLD D. CHURCH
INVENTOR
BY Richey & Watts
ATTORNEY

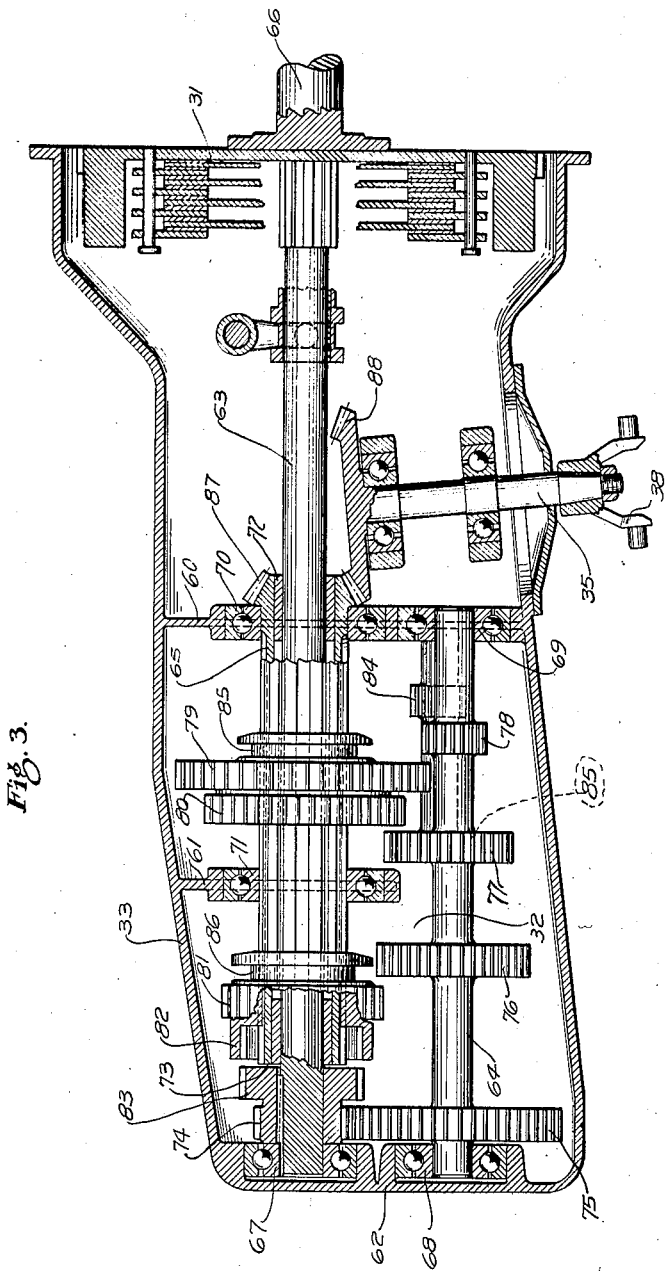

Patented Mar. 7, 1933

1,900,484

UNITED STATES PATENT OFFICE

HAROLD D. CHURCH, OF CLEVELAND, OHIO, ASSIGNOR TO THE WHITE MOTOR COMPANY, OF CLEVELAND, OHIO, A CORPORATION OF OHIO

HEAVY DUTY AUTOMOBILE CONSTRUCTION

Application filed April 20, 1929. Serial No. 356,686.

This invention relates to automobiles of the heavy duty type, ordinarily provided with more than four wheels, and is particularly directed to large automobile busses. Among the objects of my invention are the provision of an automobile bus wherein a novel arrangement of the power plant and grouping of wheels affords large passenger capacity with respect to overall length with a fairly uniform distribution of weight over a relatively extensive road area. At the same time the invention aims at the accomplishment of highly efficient results in the application of power in the changing of speeds, in steering, and in braking.

The bus herein disclosed as a preferred embodiment of my invention is known as the trolley type, designed along the lines of a street railway car, presenting a similar general appearance, and having its wheels arranged in groups at either end after the manner of railway car trucks, although the axles are permanently secured transversely to the chassis following the customary automobile practice, so that the vehicle is not actually carried on bogey trucks.

Objects and advantages of my invention beyond those mentioned above will be apparent from the following specification taken in conjunction with the accompanying drawings of a preferred embodiment thereof.

In the drawings

Fig. 1 is a plan view of an automobile bus embodying the principles of my invention, the roof and hood cover being removed;

Fig. 2 is a side elevation of the same bus; and

Fig. 3 is a horizontal section, in detail, of a transmission particularly adapted for service in a motor vehicle of this character.

Referring particularly to Fig. 1, it will be seen that my bus is rectangular in body plan with the power plant arranged transversely under a relatively short hood 11 across the entire front of the vehicle. The arrangement illustrated is for a left-hand drive, but it will be understood that the principle of the invention could equally well be utilized with a right-hand drive by an obvious shift of controls 12, driver's seat 13, entrance 14, and so forth, without necessarily reversing the power plant arrangement.

While I do not restrict myself to any particular number of wheels, the present preferred embodiment is shown and described as provided with eight wheels arranged four at each end. Power is applied only to the four rear wheels 15, and the steering is entirely accomplished by the four front wheels 16. The steering gear includes successive knuckles 17, 18 and 19, connected by longitudinal tie rods 20 and 21. The drop of the front axles 22 allows clearance for the steering gear. All eight wheels are equipped with brakes, which may be either power or hand operated, in addition to which there is a brake 23, on the propeller shaft.

The power plant comprises an engine 30 of suitable character, a clutch 31, and speed change transmission gearing 32, all mutually coaxial, placed, in the present showing, from right to left in the order named. The left end of the transmission case 33 is inclined to the rear to fit the gearing layout therein. The top of the engine is tilted slightly backward (as shown in Fig. 2) to produce a nearly straight line drive thru the propeller shaft, thus eliminating as much as possible unnecessary wear on universal joints. The radiator 34, in the instant design, is mounted in the left side of the hood, beyond the transmission case 33 having its face to the side of the vehicle. Suitable arrangements for directing air through the radiator, not shown in detail, are provided.

On account of the transverse mounting of the power plant, the propeller shaft 35 extends rearwardly from a point intermediate the clutch 31 and the transmission gearing 32, and to the left of the center line of the vehicle. In the present showing the shaft 35 is not parallel to the center line of the vehicle, but inclines inwardly about five degrees to give proper clearance to propeller shaft sections 36 and 37 further to the rear. However, this is a detail which may be modified according to the various design factors in any individual case, without departing from the spirit of my invention. To meet such requirements as keeping the floor level low, clearing the running gear of the front wheel group, and so on, the propeller shaft is constructed in a number of sections such as 36 and 37, connected by universal joints 38 and sliding sleeves 39, adjacent sections being relatively inclined as the necessities of design may require. Underslung worm drives 40 connect the propeller shaft with each rear axle.

Referring to the passenger accommodations of the bus, the interior arrangement is of conventional type, with the driver's seat 13 and the usual controls 12 at the left front, an entrance 14 at the right front and seats on either side of a central aisle 45. To keep the center of gravity low the wheels are brought up into wheel houses 46 in the body which are utilized to support side seats 47 facing inward. Where the full depth of floor is available, as in the middle and behind the rear wheels, cross seats 48 and 49 are provided. A door 50 furnishes an exit at the right rear.

Referring particularly to Fig. 2, it will be seen that the chassis consists of two longitudinal channel bar side rails 51 extending the full length of the bus. These side rails are closer spaced in front than in rear, and are shaped to clear the running gear in accordance with the usual practice in the art.

Referring particularly to Fig. 3, the transmission gearing 32 is enclosed in a case 33 having interior webs 60 and 61 and an end wall 62, all of which carry bearings for the shafting. The transmission includes a power shaft 63 extending the full length of the casing, a countershaft 64 about half as long as the power shaft, and a sleeve 65 about the same length as the countershaft, surrounding the shaft 63. The power shaft is connected to the engine crankshaft 66 by a clutch 31, herein shown as of the multiple disk type, and its far end is carried by a bearing 67. The countershaft 64 is carried by bearings 68 and 69 in the end wall 62 and in the web 60, respectively, and the sleeve 65 is supported by bearings 70 and 71 in the webs 60 and 61, respectively, and is in turn spaced from the power shaft 63 by roller bearings 72 and 73, one in each end of the sleeve.

A small spur gear 74, keyed to the far end of the power shaft 63, drives the countershaft 64 through a larger gear 75, with which it is constantly in mesh. Gears 76, 77 and 78 of varying sizes to provide for the usual changes of speed are rigidly secured to the countershaft. Other gears 79, 80 and 81 are splined on the sleeve 65 for selective engagement with the gears on the countershaft, and a positive clutch member 82 is also splined thereon and engageable with a corresponding power shaft clutch member 83. A reverse gear 84 is carried on a stub shaft below the inner end of the countershaft 64 and concealed thereby in Fig. 3. The gears 79 and 80 are secured together and are movable by means of a collar 85, and the gear 81 and clutch member 82 are likewise movable as a unit by the collar 86. The collars are actuated by forks of the usual type, not shown. Provision is thus made for four speeds forward and one in reverse, according to the gear setting. The inner end of the sleeve toward the clutch carries a bevel gear 87 herein shown as engaging at an angle of 85 degrees with a larger bevel gear 88 on the propeller shaft 35.

In a general sense the propeller shaft is placed at right angles to the axis of the power plant, although the exact angle between the power shaft and the propeller shaft may vary slightly from 90 degrees to conform to the design of the body and running gear.

The first speed is secured by shifting the connected pair of gears 79, 80 inward along the sleeve toward the engine, thus bringing the larger gear 79 into engagement with the small gear 78 on the countershaft. Similarly the shift into second speed is accomplished by moving the gears 79, 80 outward, bringing the smaller gear 80 into engagement with the relatively larger gear 77, on the countershaft, thus increasing the driving speed and reducing the mechanical advantage. To run in third speed the gears 79, 80 are left in the neutral position as shown in Fig. 3, and the gear 81 is moved inward into engagement with the countershaft gear 76. For fourth, or highest speed, the collar 86 is moved outward, bringing the positive clutch members 82, 83 into engagement, thus driving the sleeve in the same direction as the power shaft and at the same speed, the countershaft meanwhile running idly. The reverse is effected by bringing the gear 79 into mesh with an intermediate gear 84 below the plane of the countershaft but at the proper radial distance from the sleeve 65. This gear 84 is keyed to a stub shaft the other end of which carries a gear 85 in constant mesh with the gear 77, but smaller, and concealed therebelow in Fig. 3. The gears 85 and 84 are of suitable size to give the desired power ratio in reverse.

It will be seen from the foregoing that I have invented a bus of the trolley car type providing a maximum of passenger capacity in proportion to the ground space occupied, providing efficient distribution of load, of tractive and steering grip upon the road, having a low center of gravity, and having the power plant so arranged as to economize space, and particularly to save length, but without sacrificing the accessibility of the machinery.

It is to be understood that I do not limit myself to the specific form of my invention herein shown and described but that it is susceptible of various modifications, all within the scope of the appended claims.

I claim:

1. In a motor vehicle, a prime mover including a crankshaft arranged transversely of the vehicle, a transmission shaft aligned with said crankshaft, a clutch between said shafts, a speed change gear including a countershaft parallel to said transmission shaft and a sleeve surrounding said transmission shaft but rotatable independently thereof, gear connections between said shafts and said sleeve, and a propeller shaft extending longitudinally of the vehicle driven from said sleeve at approximately a right angle thereto.

2. In a motor vehicle, an engine having a power shaft arranged transversely of the vehicle, a driving shaft coaxial with said power shaft, a clutch releasably coupling said shafts, a countershaft geared to said driving shaft, a driven shaft adapted to be geared to said countershaft or directly coupled to said driving shaft for rotation therewith, and a propeller shaft extending longitudinally of the vehicle disposed between said clutch and the adjacent end of said countershaft and geared to said driven shaft.

3. In a motor vehicle, an engine having a power shaft arranged transversely of the vehicle, a driving shaft co-axial with said power shaft, a clutch releasably coupling said shafts, a countershaft geared to said driving shaft, a driven shaft adapted to be selectively geared to said countershaft or directly coupled with said driving shaft, a member supporting said driving shaft, driven shaft, and countershaft, and a propeller shaft intermediate said member and said clutch geared to said driven shaft.

4. In a motor vehicle, an engine having a power shaft arranged transversely of the vehicle, a driving shaft co-axial with said power shaft and driven thereby, a counter shaft geared to said driving shaft, a driven shaft adapted to be geared to said countershaft or directly coupled to said driving shaft for rotation therewith, and a propeller shaft extending longitudinally of the vehicle disposed between said engine and the adjacent end of said countershaft and geared to said driven shaft.

In testimony whereof I hereunto affix my signature this 15th day of April, 1929.

HAROLD D. CHURCH.